Figure 14:
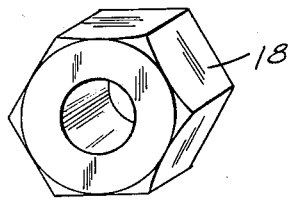

April 24, 1934.     B. P. SCHILTZ     1,955,775
APPARATUS FOR HANDLING WORK PIECES
Filed April 18, 1932     5 Sheets-Sheet 1

Inventor
Bernard P. Schiltz
By Bates, Golrick & Teare
Attorneys

April 24, 1934.    B. P. SCHILTZ    1,955,775
APPARATUS FOR HANDLING WORK PIECES Filed April 18, 1932    5 Sheets-Sheet 2

Inventor
Bernard P. Schiltz
By Bates Golrick & Teare
Attorneys

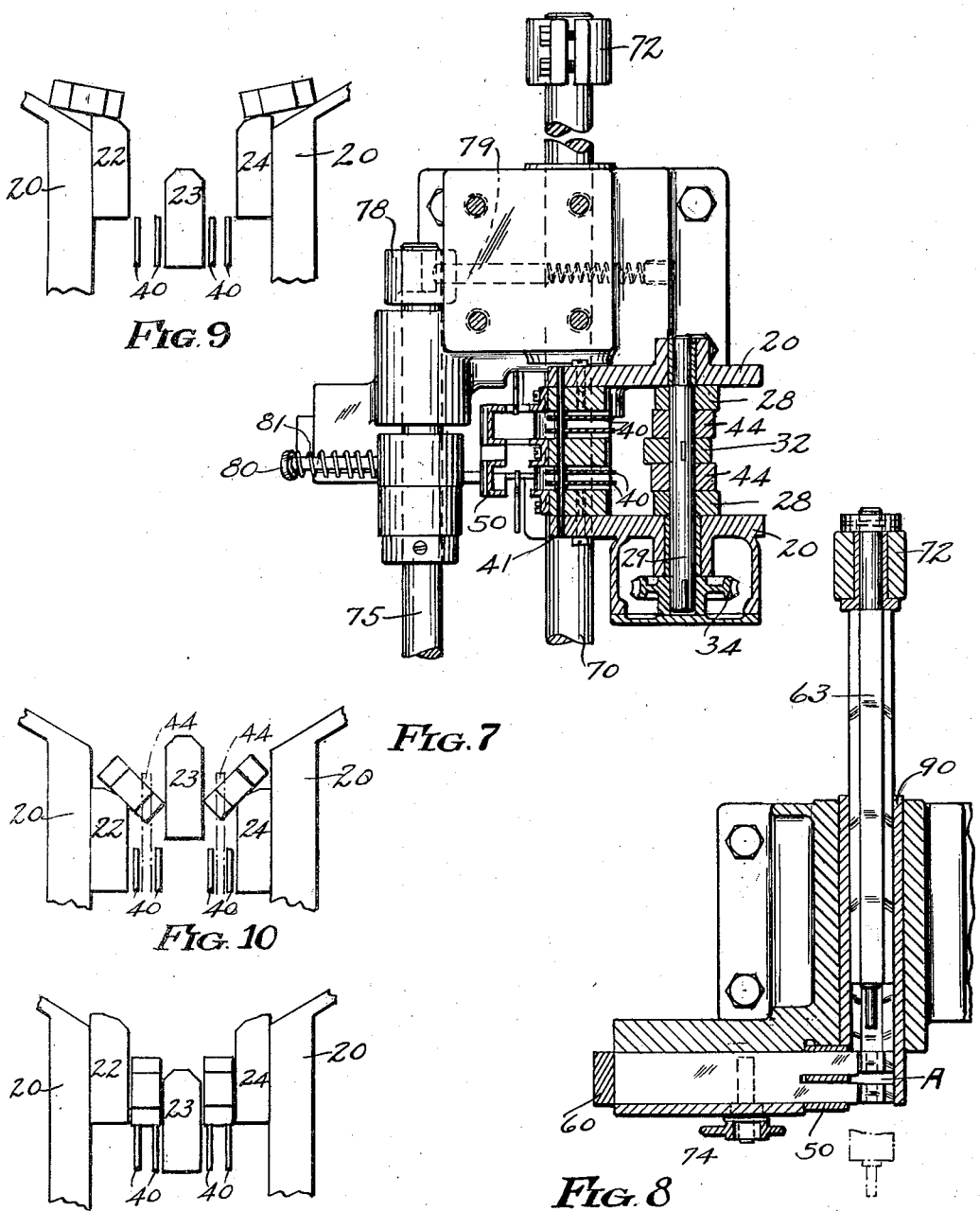

Patented Apr. 24, 1934

1,955,775

UNITED STATES PATENT OFFICE 1,955,775

APPARATUS FOR HANDLING WORK PIECES

Bernard P. Schiltz, Cleveland, Ohio, assignor to The Foote Burt Company, Cleveland, Ohio, a corporation of Ohio Application April 18, 1932, Serial No. 605,803

12 Claims. (Cl. 10—162)

This invention is concerned with hopper feed mechanisms and has for its general object the provision of a novel method of selecting work pieces from a pile of such pieces and arranging the same in courses, whereby the work pieces may be conveniently automatically fed to machines which effect operations upon the work pieces.

Another object of the present invention is the provision of an apparatus for carrying out my novel method of selecting and arranging work pieces, and which mechanism is adaptable to the handling of work pieces of various shapes at a relatively high rate of speed.

A still further object of my invention is the provision of a hopper mechanism, which will be effective in arranging work pieces of common shape in soldier course arrangement, whereby the same may escape through the bottom of the hopper into guideways or raceways, leading to a feed mechanism.

A further object of my invention is the provision of hopper mechanism, which will be effective in prearranging work pieces placed therein, whereby the work pieces through the influence of agitation imparted to a pile of such pieces, gravitational influence upon individual work pieces and the weight of the pile of work pieces will cause certain of the work pieces to become arranged in desired rows and in a continuous manner.

Other objects of my invention will become apparent from the description of my novel method of handling the work pieces and the description of the mechanism through which I effect the same, and which mechanism is illustrated in the drawings. The essential features of the invention are summarized in the claims.

Figure 1:
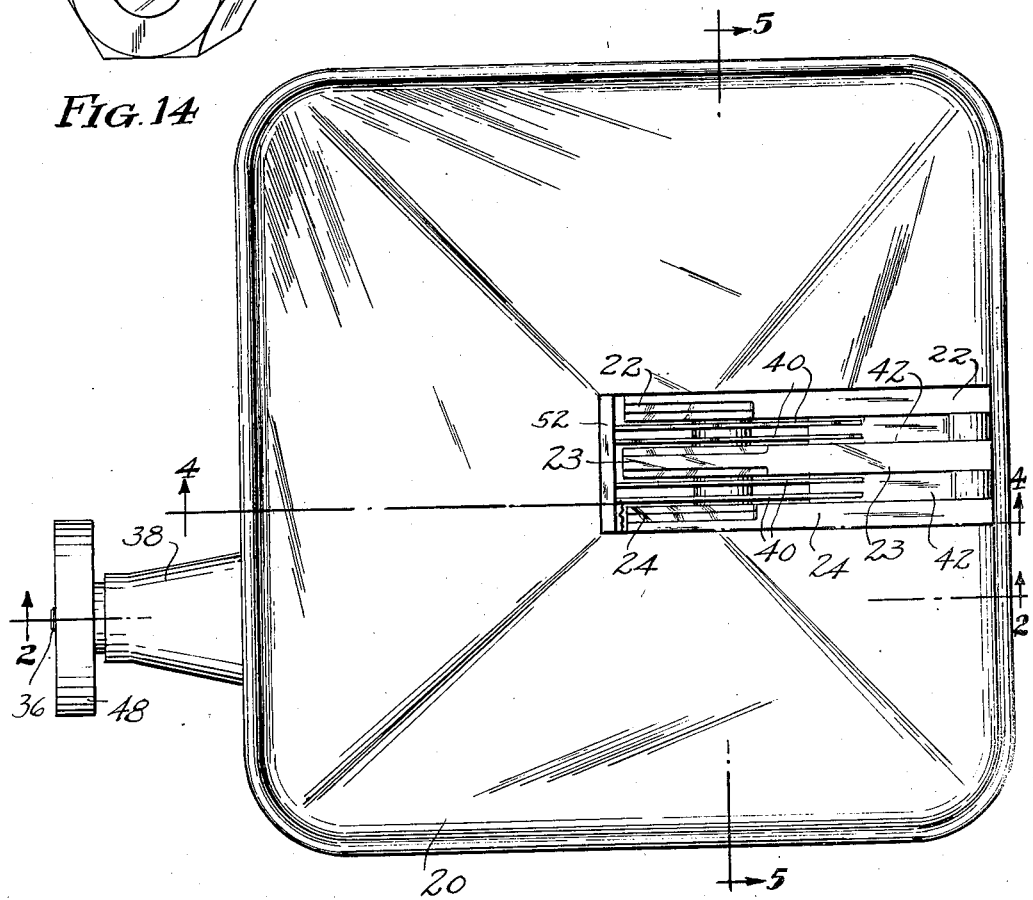
Figure 15:
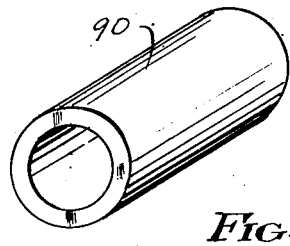
Figure 2:
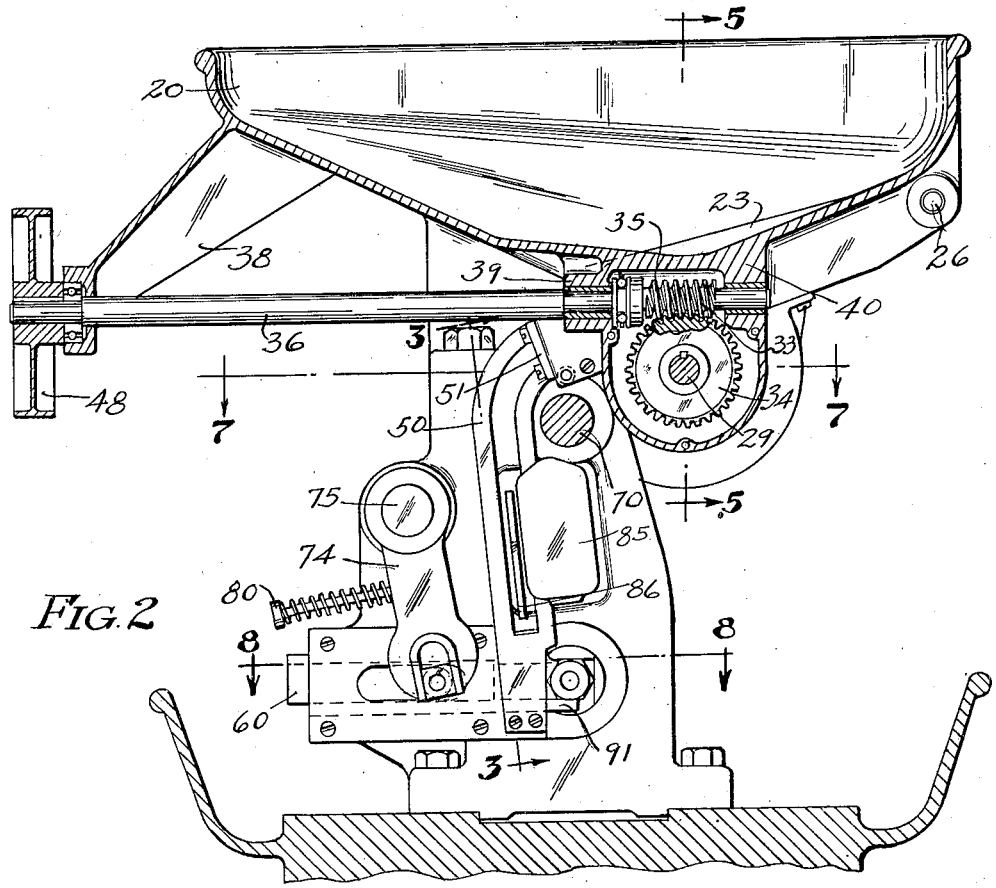
Figure 3:
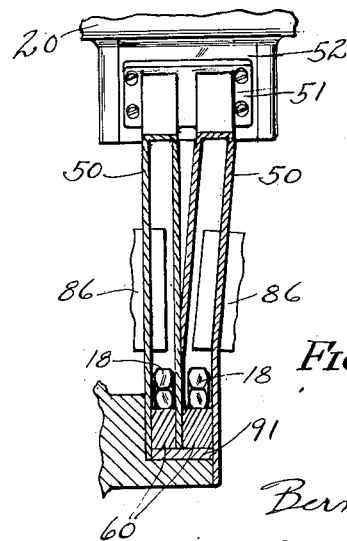
Figure 4:
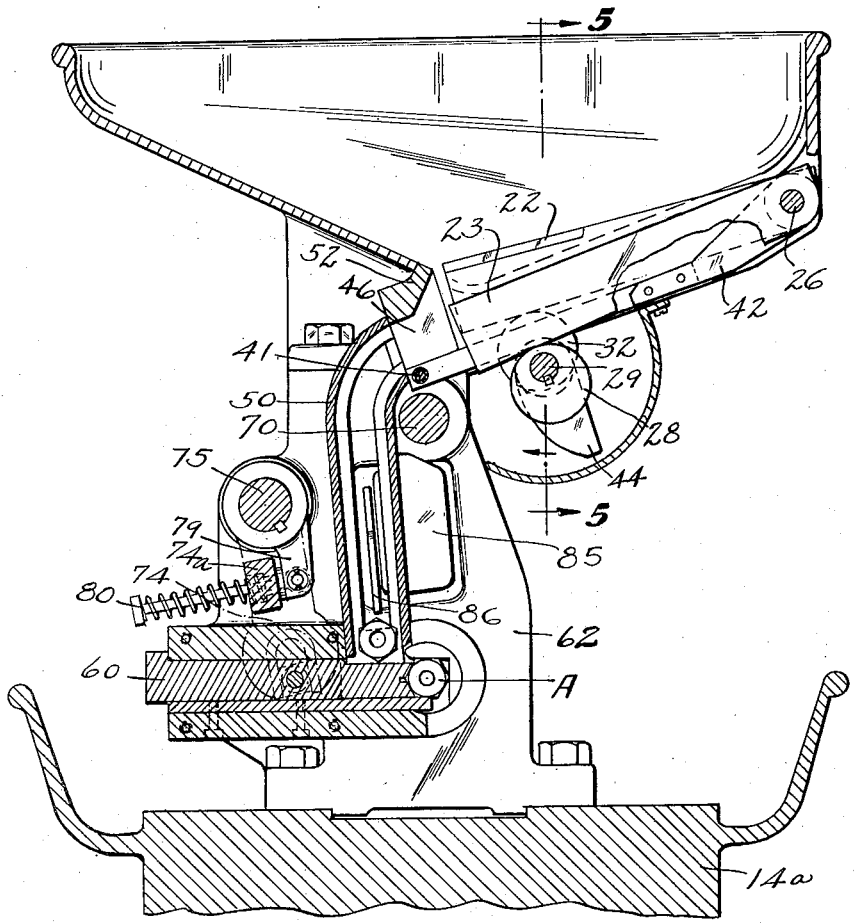
Figure 6:
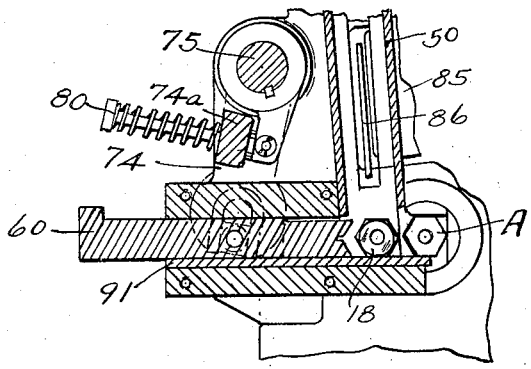
Figure 5:
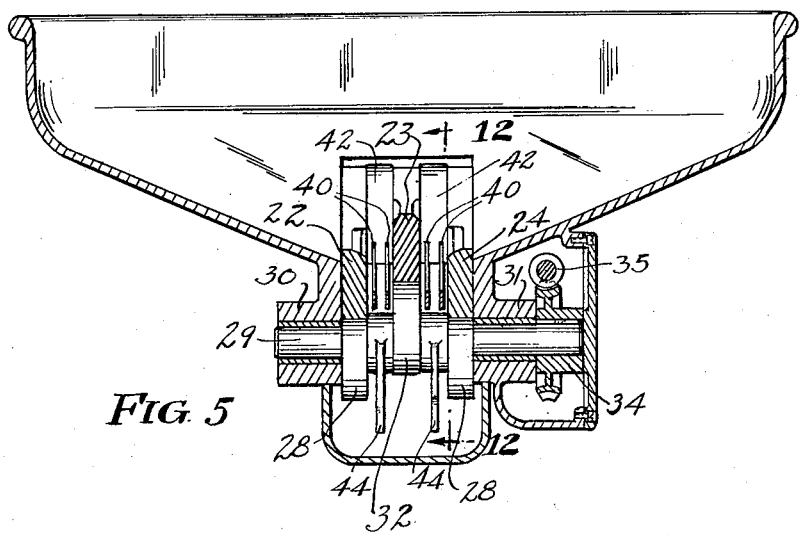
Figure 12:
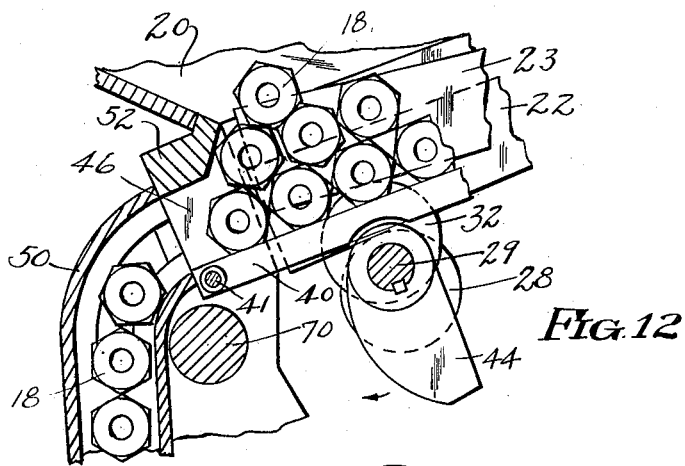
Figure 13:
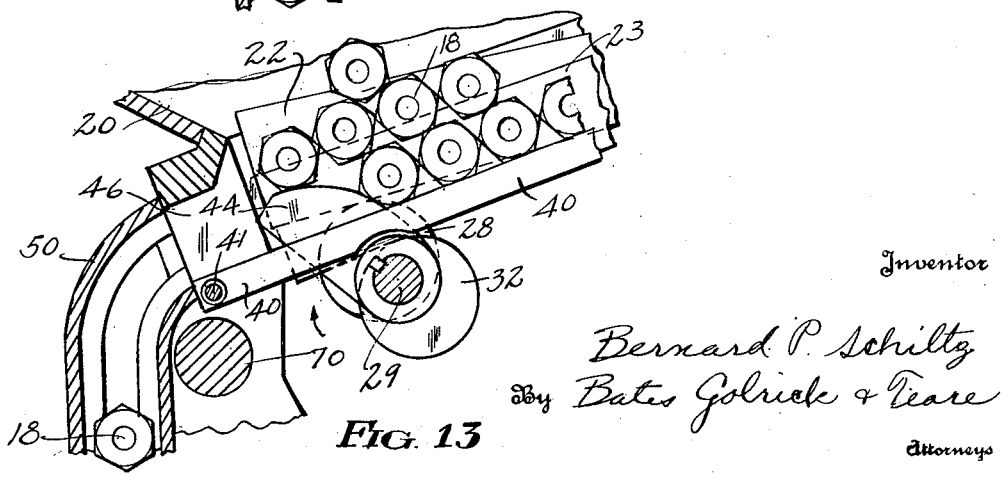

In the drawings, Fig. 1 is a plan view of a hopper mechanism adapted to fulfill the novel features of my method of handling work pieces; Fig. 2 is a cross sectional elevation of the hopper mechanism taken substantially along the line 2—2 of Fig. 1 and showing the hopper mechanism associated with a feed mechanism adaptable to the handling of hexagonal nuts; Fig. 3 is a cross sectional detail through the hopper mechanism taken substantially along the line 3—3 of Fig. 2; Fig. 4 is a transverse cross sectional elevation taken substantially along the line 4—4 of Fig. 1 and showing in cross section certain of the hopper mechanism elements and the feed mechanism elements; Fig. 5 is a cross sectional elevation taken through the hopper mechanism normal to the section shown in Fig. 4 and substantially along the line 5—5 of Figs. 1, 2 and 4; Fig. 6 is a cross sectional fragmentary view of the feed mechanism shown in cross section in Fig. 4 and illustrating a retractile position thereof; Fig. 7 is a cross sectional plan view through certain of the elements of the hopper mechanism, taken substantially along the line 7—7 of Fig. 2; Fig 8 is a similar cross section taken substantially along the line 8—8 of Fig. 2 and illustrating the relationship between two work shifting elements; Figs. 9, 10 and 11 are diagrammatic illustrations of the manner in which work pieces deposited within the hopper are acted upon by the hopper mechanism; Figs. 12 and 13 are enlarged fragmentary cross sectional views taken substantially along the line 12—12 of Fig. 5 and illustrating the manner of agitating certain of the work pieces within the hopper at the work piece exit from the hopper; Fig. 14 is a perspective view of the work piece comprising a standard nut and which the present mechanism is proportioned to handle, while Fig. 15 is a perspective view of a conduit coupling and which has been handled with equal facility by the present method and mechanism.

My invention contemplates the provision of the method of agitating a pile of work pieces while the same are within a hopper to cause sifting movement of the work pieces in the lower or under side of the pile thereof, whereby the work pieces can be manœuvred into a desired arrangement or alignment, and I fulfill this method by supporting the pile of work pieces while permitting certain of the work pieces to drop from the pile into inclined slots arranged at the bottom of the hopper, and I effect this desired movement of the work pieces by utilizing the weight of the pile of work pieces, the gravitational influence upon each individual work piece, and by mechanical agitation, whereby certain of the work pieces when manœuvred into the desired position are permitted to be dropped into the slots and retained therein by the walls of the slots as the work pieces gradually move toward exits associated with raceways which guide the work pieces to an appropriate feed mechanism.

In the drawings, I have illustrated my method when applied to a novel apparatus adapted to the handling of machine nuts, whereby the nuts can be fed to a threading mechanism in a duplex manner, whereby two nuts can be tapped upon each cycle of the feed mechanism. The tapping mechanism is not included in the illustrations, and the invention can be embodied to feed either a single course of work pieces or a plurality of courses, so long as the work pieces have a common dimension.

Referring to the drawings in Fig. 1, I show my invention in association with a hopper 20, which is open at the top, comparatively shallow and the walls thereof are sloped to an elongated opening formed in the bottom of the hopper. Within the bottom opening of the hopper and in definite relation to the sloping walls thereof is a work piece agitating and selecting mechanism in the form of a plurality of oscillating bars 22, 23 and 24, which are spaced apart to provide slots therebetween, the width of the slots having a definite relation to the common dimension of the work pieces to be handled by the hopper, whereby the work pieces may be manœuvred into the slots.

In the present instance such a work piece comprises a standard hexagonal nut 18 (see Fig. 14) and the width of these slots between the oscillating members 22, 23, and 24 is slightly greater than the thickness dimension of the nut to permit and effect oscillation. The bars 22, 23 and 24 are mounted upon a pin 26, suitably secured adjacent one end of the bottom of the hopper wall and the bars are of such length as to extend in an inwardly and downwardly sloping direction to substantially the middle of the hopper, and the free ends of the bars rest upon eccentrics or cam members 28 and 32, which are rigidly mounted upon a shaft 29, suitably supported by depending bearing portions 30 and 31, preferably cast integrally with the bottom wall of the hopper.

In order to facilitate movement of the work pieces toward the above referred to slots, the bars 22 and 24 are disposed to be immediately adjacent the side walls of the hopper bottom opening, as illustrated in cross section in Fig. 5. It will be noted that the central bar 23 rests upon an eccentric cam 32, also rigidly attached to the shaft 29, and the eccentric action of the pair of cams 28 and the cam 32 is substantially 180° apart consequent upon the revolving of the shaft 29. The shaft 29 is driven by a worm gear 34, which worm gear is actuated by a worm 35. The worm 35 is secured to one end of a shaft 36, extending longitudinally of and beneath the hopper. The shaft 36 may be supported in any suitable manner, such as depending bearing portions 38, 39 and 40, preferably cast integrally with the walls of the hopper. The shaft 36 may be driven in any suitable manner, preferably at a speed which will cause rotation of the cams 28 and 32 at a rate of from 30 to 50 revolutions per minute. The shaft 36 may be driven with a pulley 48 by a belt leading to a convenient source of power.

The height of the bars 22, 23 and 24 is such as to be greater than the height of the work pieces when the same are deposited within the slots between the bars, and I provide bottom walls for the slots in the form of metallic strap members 40, which are supported at their inner end by any suitable means such as a pin 41 and at their upper, outer ends by the pin 26. It will be apparent that the bars 40 and their supporting arms 42 have no movement but merely serve to support the work pieces when once arranged within the slots, and the bars afford an open bottom formation for the slots, whereby any chips carried by the work pieces into the hopper are permitted to escape before being carried with the work pieces into the machine. If desired, the bars 22 and 24 may be spaced a slight distance from the side walls of the hopper bottom opening to also permit chips to drop out of the hopper.

The open bottom formation of the bars is also provided to permit the use of a work piece kicker cam member or cam members 44, as the case may be, which cam members are carried by the shaft 29 at positions disposed between the eccentric cam members 28 and 32, so that as the shaft revolves, the connector members 44 are caused to revolve into the slots (see Figs. 12 and 13), whereby the arranged pieces of work within the slots are shifted upwardly while remaining in the slots, that is, from the left to the right in Figs. 12 and 13, and this action will cause displacement of any work pieces which are straddling the slots by riding the bars 22, 23 or 23, 24. Accordingly, the upward reach of the kicker cams is such as to extend above the top surfaces of the bars when the kicker cams are revolved to the uppermost position thereof. As the kicker cams revolve out of the path of movement of the work pieces within the slot, the work pieces then shift by gravity from right to left of Figs. 4, 12, 13, and escape through openings 46, formed in the bottom wall of the hopper to be in alignment with the slots between the bars 22, 23 and 23, 24. I provide a raceway 50 or raceways, as the case may be in assocation with the exit openings 46 and extending downwardly therefrom, whereby the work pieces as they escape from the hopper are guided downwardly to appropriate feed mechanism. The raceways 50 may comprise channeled members, suitably formed and spaced to conform to the shape of the work pieces, and the members 50 may be secured as indicated at 51 (see Fig. 2) in any suitable manner, such as flanged connections secured by screws or bolts to the bottom of the hopper. For convenience in machining I provide a member 52, which may be attached to and comprise part of the hopper bottom, the member 52 having the exit openings 46 formed therein.

If desired, a stop mechanism may be associated with the raceways for stopping the machine being fed with work pieces and I show in Figs. 2 and 4 a switch mechanism within a casing 85 mounted adjacent each raceway whereby a sensitively suspended switch operating member 86 may extend into the path of movement of the work pieces within the raceway. When the raceway becomes empty the member 86 is spring-urged inwardly and the switch with the housing 85 functions to stop the motor driving the machine being fed by the hopper mechanism.

As hereinbefore stated, the raceways extend downwardly to a feed mechanism, which is adapted to feed the work to any suitable form of chuck, whereby the work may be held for subsequent further machining operations and, as stated, in the present instance the work feed mechanism is adapted to feed nuts to a chuck wherein the nuts are held two at a time, while being threaded with a tap and the particular feed mechanism illustrated is adapted to coordination in a machine such as is disclosed in the Kelleher Patent No. 1,645,285, issued October 11, 1927. The actuation of the work feeding elements is obtained from movement of certain of the elements of the machine illustrated in said patent. The machine of said patent taps a piece of work with a tap driven by a spindle, the tap having a sufficiently long shank to carry several pieces of the work, which have been tapped upon each cycle of the mechanisms of the machine, the spindle is disengaged from the tap shank, one piece of work is stripped therefrom, the work is fed to the chuck and the feeding of the work to the chuck repositions the tap to start a new piece of work. The spindle then automatically engages the shank of the tap and the tap advances into the work. When the spindle is disengaged from the tap, the chuck serves to hold the work and tap.

In the drawings of the present application, the work is dropped through a double raceway 50 (see Fig. 3) and at the bottom of the raceways is a transversely operable work shift plunger 60, which shifts the work in pairs to the position shown at A in Fig. 4. The center of the work at this position comprises the center line or axis of the spindle and tap of the machine referred to. The plunger 60 and its operating mechanism, as well as the hopper are assembled in convenient cooperative relation upon a machine frame 62, which is bolted to the bed 14A of the machine. A shiftable bar 70 of said machine and which corresponds to the bar 56 of said patent extends immediately beneath the hopper through the machine frame member 62 to the rear end of the machine and this bar is connected to a work feed bar 63 (see Fig. 8) by an arm 72, so that when the bar 70 is shifted longitudinally the feed bar 63 is likewise shifted. The feed bar 63 is in alignment with the center of the work when the work is in the position A (see Figs. 4 and 8). The transverse feed bar 60 is operated by a swinging movement of a lever 74, which is swingably mounted upon the shaft member 75, the shaft member 75 corresponding to the shaft 93 of said patent, and the shaft member 75 being operated positively from left to right as viewed in Figs. 4 and 6, and spring returned to the position shown in Fig. 6 by a lever member 78 operated by a spring urged plunger 79, suitably mounted in the machine frame member 62 (note Fig. 7). A resilient connection is provided between the lever 74 and the shaft 75 through a short arm 79 keyed to the rock shaft 75, immediately adjacent the swinging lever 74, there being a pin 80 and spring 81, operably disposed between a boss 74a formed on the lever 74 and the short lever arm 79, whereby a slight overstroke from left to right of the short lever 79 may take place without damage to the machine parts.

The transverse feed plunger 60 and the longitudinal feed plunger 63 are provided with suitable slideway accommodations (note the sleeve 90 in Fig. 8 and the gib 91 in Fig. 6), whereby these plungers can vary in shape and size depending upon the shape and size of the work being handled by the hopper and feed mechanisms.

A résumé of the operation of the machine is as follows:

A quantity of work pieces are loaded into the hopper until the hopper is filled either level with the top or higher, as desired. The shaft 36 is then driven by any suitable power means either in the form of a power take-off from the main machine or an independent belt drive, and the driving of the shaft 36 thus causes rotation of the hopper shaft 29 through the worm gear reduction 35—34, thus causing rotation of the pair of eccentric cam members 28 and the central cam member 32, as well as the kicker cam 44, all of which are keyed to the shaft 29 in timed relationship. The two outer bars 22 and 24 are caused to be raised and lowered in unison and the central bar 23 is raised and lowered alternately relative to the bars 22 and 24. This actuation causes the pile of work pieces to be agitated within the hopper from the bottom side up and the work pieces are gradually manœuvred by the bars, as indicated by the diagrams in Figs. 9, 10 and 11 until the work pieces drop into the slots afforded by the spacing of the bars 22, 23 and 24. The work pieces may or may not become arranged in decked alignment, as illustrated in Figs. 12 and 14, but at least the bottom row of work pieces will become thus arranged and as the kicker cams 44 revolve upwardly into the slots, these kicker cams, by reason of their length will dislodge any work pieces which are riding or rocking upon the tops of the bars adjacent the exit end of the hopper. Now after the kicker cams 44 have rotated downwardly out of contact with the work pieces, the work pieces quickly shift toward the exits 44 of the hopper bottom by reason of the inclined disposition of the bars and slots afforded thereby and escape into the raceways 50. Rocking actuation of the shaft 75 (see Fig. 4) will cause the transverse feed bar 60 to be shifted to the outward position shown in Fig. 6 and the rocking of the shaft 75 and depending arm 74 from left to right will cause a pair of the pieces of work to be shifted out of alignment with the remaining work pieces in the raceways to the position shown at A in Figs. 4 and 6. The longitudinal shifting movement of the actuating bar 70 and feed bar 63 is timed relative to the movement of the shaft 75, so that the feed bar 63 will be caused to shift inwardly only after the transverse feed bar 60 has reached the inward position shown in Fig. 4, and has started its retractive movement. This cycle of operations can be repeated at a rate which will be dependent upon the nature of the cutting operations and the time required therefor by the machine which is being fed by the hopper and feed mechanism. Accordingly, the speed of the agitator shaft 29 will be dependent upon the feed demands of the machine being fed with work, as well as the shape and size of the work.

The foregoing described method of handling work pieces to arrange them for introduction to raceways in a feed mechanism, has been adapted to various shaped pieces of work. As an example, in Fig. 15 a conduit coupling 90 is shown in perspective which can be readily handled by the method described, as well as the mechanism for carrying out the steps of the method, the conduits being axially aligned and fed longitudinally down the raceways. It will be apparent also that the method is adaptable for use for the simultaneous charging of one or several raceways, as may be desired, so long as the work pieces have a common dimension.

I claim:

1. In a hopper mechanism, a hopper bowl having a comparatively large opening for receiving a multiplicity of pieces of work in promiscuous arrangement, work agitating mechanisms disposed at the bottom of the hopper, the hopper walls being sloped to guide the multiplicity of work pieces to said mechanisms under gravitational influence, said mechanisms acting substantially upon the major part of the work pile within the hopper to cause the work pieces to drop into soldier course arrangement, said mechanisms including oscillating members spaced in definite relation to a dimension common to each of the work pieces, and a kicker mechanism associated with said oscillating members to shift any work pieces persistently lodged upon said oscillating members out of aligned arrangement to other of the pieces of work arranged between the oscillating members and a raceway leading from adjacent the ends of the oscillating members for receiving the arranged pieces of work as the same become arranged by the oscillating action of said members.

2. In a hopper mechanism, a hopper bowl having a comparatively large top opening for receiving a multiplicity of pieces of work in promiscuous arrangement and a bottom opening, work agitating mechanisms disposed to operate in said bottom opening of the hopper, the hopper walls being sloped to guide the multiplicity of work pieces to said mechanisms under gravitational influence, said mechanisms acting to cause the work pieces to drop into soldier course arrangement, said mechanisms providing a slot having a width slightly greater than a dimension common to each of the work pieces, and a work kicker and a cam mechanism associated with said agitating mechanisms to upwardly eject any work pieces persistently lodged upon said agitating mechanisms out of arrangement relative to other of the pieces of work arranged in the slot and a raceway leading from adjacent the ends of the oscillating members for continuously receiving the arranged pieces of work as the same become arranged by the agitating mechanisms.

3. In a hopper mechanism, a hopper bowl having a wide opening at the top and sloping side walls, the bowl being of an open formation throughout substantially half the bottom wall thereof and said opening having arranged therein work agitating mechanism comprising substantially parallel oscillating members spaced apart and adapted to agitate the pieces of work within the bowl when placed in the bowl and to cause arrangement of certain of the agitated pieces of work between said spaced apart members, cam mechanism for oscillating said members and ejector mechanism associated with the cam mechanism and disposed to force upwardly pieces of work lodged upon the tops of said oscillating members and which has not been arranged properly thereby.

4. In a hopper mechanism, a hopper bowl having a wide opening at the top and sloping side walls, the bowl being of an open formation throughout substantially half the bottom wall thereof and said opening having arranged therein work agitating mechanism comprising substantially parallel oscillating members spaced apart to afford two slots and adapted to agitate the pieces of work within the bowl when placed in the bowl and to cause arrangement of certain of the agitated pieces of work within said slots, cam mechanism for oscillating said members in alternate movements and ejector mechanism associated with the cam mechanism and disposed to clear the path of movement of the work pieces arranged in the slots.

5. In a hopper mechanism, the combination of a bowl, a plurality of oscillating members comprising part of the bowl wall to thereby contact with a multiplicity of pieces of work within the bowl, said oscillating members being spaced to afford slots into which the pieces of work are caused to drop in soldier course arrangement, a plurality of raceways associated with the slots to receive the arranged pieces of work in a continuous manner, and work ejector mechanisms associated with the slots for forcing upwardly any pieces of work not properly arranged within the slots by said oscillating members.

6. In a hopper mechanism, the combination of a bowl, work agitating members comprising part of the bowl wall to thereby contact with a multiplicity of pieces of work within the bowl, said agitating members being spaced apart to form a slot therebetween into which the pieces of work are guided by said agitating members, a raceway mechanism associated with the agitating members to receive the arranged pieces of work from the slot, and work kicker mechanism associated with the slot for intermittently kicking the pieces of work within the slot to prevent jamming of the work at the entrance to the raceway.

7. In a hopper mechanism, a hopper bowl, a pair of oscillating bars pivotally mounted at one end adjacent the bottom of the hopper bowl and extending through an opening in the bottom of the hopper bowl into the bowl cavity, means for alternately causing oscillation of said bars, the bars being spaced apart a definite distance relative to a common dimension of the work pieces placed in the hopper, means disposed between said oscillating members and with which the oscillating members define a slot into which the work pieces may drop in soldier course relationship, said oscillating members and slot forming means being sloped relative to the horizontal, whereby work pieces deposited within the slot will be caused to shift downwardly toward one end of the slot, a raceway associated with said end of the slot and a work piece shifting and ejecting means associated with the slot, whereby the aligned work within the slot is caused to be shifted upwardly along the slot and whereby other work pieces in misaligned relationship to the oscillating members and the slot are forced upwardly into the mass of work pieces within the hopper.

8. A hopper mechanism comprising a hopper bowl, an elongated opening formed in the bottom of the bowl, the walls of the hopper sloping to said opening and the immediate walls of the opening relative to the work comprising oscillatable bars pivoted at one end and sloping downwardly toward the other end, a raceway terminating at said last-named ends, and means for oscillating said bars and for momentarily shifting upwardly aligned pieces of work deposited by gravitational and agitational influence between the bars.

9. In a hopper mechanism, a hopper bowl having a sloping bottom wall, an elongated slot in said wall, a pair of elongated members pivoted at one end and having their upper edges normally supported in the plane of said bottom wall, said members being spaced apart to form a raceway therebetween substantially equivalent to a small dimension of the work, a bottom wall in said raceway sloping downwardly from the pivot of said members and extending to their opposite ends, said last-named wall being stationary relative to the hopper bowl, a second raceway leading from the first named raceway to carry work lodged therein away from the hopper, both of said raceways being below the bottom of said hopper, means operative on said members to alternately rock them about their pivots into the hopper and thereby agitate the work within said hopper, and an independent means arranged to intermittently engage the work in the first-named raceway and interrupt its progress to the second named raceway.

10. In a hopper mechanism, a hopper bowl having downwardly and inwardly sloping walls and adapted to receive a plurality of work pieces in a promiscuous arrangement, an elongated slot in one of said sloping walls, the elongated side walls of said slot being formed by a pair of members pivoted adjacent the highest end of said slot, a bottom wall for said slot, said bottom wall sloping in the same direction as the sidewalls adjacent the slot and rigidly secured to the bowl, means to alternately rock said members about their pivots upwardly into the hopper bowl to agitate work therein, a raceway leading from the lowermost end of said slot to carry aligned work away from the hopper bowl, and wherein the upper surfaces of said members slope at all times toward the raceway.

11. In a hopper mechanism, a hopper bowl having downwardly sloping walls, one of said walls having an elongated slot therein, a pair of elongated pivoted bars in said slot and spaced apart from each other to form a raceway therebetween to receive aligned pieces of work, said raceway being open along its upper side whereby a plurality of aligned pieces of work may simultaneously enter said raceway, a stationary sloping bottom wall for said raceway, means to rock said bars about their pivots through a limited angle to agitate the work, wherein the bars slope at all times towards the lowermost part of the hopper so that work pieces may travel between and on top of said bars toward the lowermost point of the hopper under influence of gravitation regardless of the number of pieces of work in the hopper bowl, and a second raceway leading from the lowermost point in the first-named raceway to convey aligned pieces of work away from the hopper.

12. In a hopper mechanism, a hopper bowl having downwardly sloping walls, one of said walls having an elongated slot therein, a pair of elongated pivoted bars in said slot and spaced apart from each other to form a raceway therebetween to receive aligned pieces of work, said raceway being open along its upper side whereby a plurality of aligned pieces of work may simultaneously enter said raceway, a stationary sloping bottom wall for said raceway, means to rock said bars about their pivots through a limited angle to agitate the work, wherein the bars slope at all times towards the lowermost part of the hopper so that work pieces may travel between or on top of said bars toward the lowermost point of the hopper under influence of gravitation regardless of the number of pieces of work in the hopper bowl, a second raceway leading from the lowermost point in the first-named raceway to convey aligned pieces of work away from the hopper, and an arm mounted to intermittently shove the work therein against the action of gravitation to thereby prevent jamming of work in either raceway.

BERNARD P. SCHILTZ.